United States Patent
Krager et al.

(10) Patent No.: US 9,142,946 B2
(45) Date of Patent: Sep. 22, 2015

(54) CABLE RETENTION SYSTEM

(71) Applicant: Caterpillar Inc., Peoria, IL (US)

(72) Inventors: Justin Krager, Taylorville, IL (US); Joseph Rottman, Decatur, IL (US)

(73) Assignee: Caterpillar Inc., Peoria, IL (US)

( * ) Notice: Subject to any disclaimer, the term of this patent is extended or adjusted under 35 U.S.C. 154(b) by 151 days.

(21) Appl. No.: 13/928,496

(22) Filed: Jun. 27, 2013

(65) Prior Publication Data

US 2015/0001351 A1    Jan. 1, 2015

(51) Int. Cl.
*F16L 3/00* (2006.01)
*H02G 3/32* (2006.01)

(52) U.S. Cl.
CPC .................................. *H02G 3/32* (2013.01)

(58) Field of Classification Search
CPC combination set(s) only.
See application file for complete search history.

(56) References Cited

U.S. PATENT DOCUMENTS

| | | | |
|---|---|---|---|
| 1,133,976 A | | 3/1915 | Kraus |
| 2,417,260 A | * | 3/1947 | Morehouse .................... 174/135 |
| 2,761,714 A | * | 9/1956 | Cuskie .......................... 403/225 |
| 2,937,835 A | * | 5/1960 | Csmereka .................... 248/74.4 |
| 3,186,051 A | | 6/1965 | Waddell |
| 3,216,683 A | | 11/1965 | Girard |
| 3,592,427 A | | 7/1971 | Misuraca |
| 4,273,465 A | * | 6/1981 | Schoen ......................... 403/391 |
| 4,733,016 A | * | 3/1988 | Twist et al. ................... 174/657 |
| 4,767,086 A | * | 8/1988 | Blomqvist ....................... 248/56 |
| 5,098,047 A | * | 3/1992 | Plumley ...................... 248/68.1 |
| 5,742,982 A | * | 4/1998 | Dodd et al. .................... 24/16 R |
| 5,783,776 A | * | 7/1998 | Birmingham et al. ........ 174/657 |
| 6,173,926 B1 | * | 1/2001 | Elvegaard .................... 248/74.1 |
| 6,308,921 B1 | * | 10/2001 | Borzucki ..................... 248/68.1 |
| 6,561,466 B1 | | 5/2003 | Myers et al. |
| 7,355,130 B2 | * | 4/2008 | Holman et al. ............... 174/658 |
| 7,380,754 B2 | * | 6/2008 | James et al. .............. 244/135 R |
| 8,074,945 B2 | | 12/2011 | Schoenau et al. |
| 8,342,474 B2 | | 1/2013 | Gilbreath |
| 8,656,668 B2 | * | 2/2014 | Monden .......................... 52/232 |
| 8,770,537 B2 | * | 7/2014 | Go ................................ 248/560 |
| 2003/0025048 A1 | | 2/2003 | Knotts |
| 2008/0017761 A1 | * | 1/2008 | Hashimoto .................. 248/68.1 |
| 2009/0224111 A1 | | 9/2009 | Gilbreath |
| 2010/0019106 A1 | * | 1/2010 | Sisley ......................... 248/68.1 |
| 2010/0148018 A1 | | 6/2010 | Schoenau et al. |
| 2011/0253846 A1 | * | 10/2011 | Kataoka et al. ............. 248/68.1 |
| 2012/0032036 A1 | * | 2/2012 | Andersson et al. .......... 248/74.1 |
| 2013/0148937 A1 | | 6/2013 | Rudenick et al. |

FOREIGN PATENT DOCUMENTS

| | | |
|---|---|---|
| DE | 102005002879 | 8/2006 |
| GB | 2337870 | 12/1999 |
| JP | 10185004 | 7/1998 |
| WO | 2007094736 | 8/2007 |

* cited by examiner

*Primary Examiner* — Monica Millner
(74) *Attorney, Agent, or Firm* — Foley & Lardner LLP

(57) ABSTRACT

A cable retention system for securing one or more cables or hoses to a structure or frame includes a base plate, a first sidewall, a second sidewall, a top plate and at least one modular block. The cable retention system is customizable such that additional cables may be added or removed to the system as needed.

20 Claims, 4 Drawing Sheets

CABLE RETENTION SYSTEM

TECHNICAL FIELD

The present disclosure is directed to a cable retention system, and more particularly, to a modular block system for mounting electrical cables.

BACKGROUND

This section is intended to provide a background or context to the invention recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Typically conduits, for example, hoses, pipes, or wires, are mounted to fixed or movable structural elements. For example, hydraulic hoses may be mounted to movable components of a machine frame or electrical wires may be mounted to a fixed wall of a building. Conduit mounting systems often include a plurality of modular elements interconnected with one another and forming openings for supporting a conduit relative to additional conduits and to the structural element. Utilizing modular components reduces the number of different parts associated with a mounting system. However, the number and/or type of conduits that a particular modular mounting system may accommodate may be reduced as compared to a customized mounting system.

U.S. Pat. No. 6,561,466 ("the '466 patent") issued to Myers et al. discloses an interchangeable hose, cable, and conduit support mechanism. The mechanism includes a pair of substantially identical covers interconnected and forming a first cavity adapted to retain a pair of substantially identical inserts. The pair of inserts forms a second cavity that is adapted to retain a conduit. Each cover respectively includes an extension and a receptacle to interlock a pair of covers together. The extension of a first cover is configured to extend into the receptacle of a second cover and the extension of the second cover is configured to extend into the receptacle of the first cover. Each insert respectively includes an extension and a receptacle to interlock a pair of inserts together. The extension of a first insert is configured to extend into the receptacle of a second insert and the extension of the second insert is configured to extend into the receptacle of the first insert.

SUMMARY

In one embodiment the disclosure includes a modular block for a cable retention system having first and second longitudinal sides spaced apart and substantially parallel with each other; third and fourth transverse sides spaced apart and substantially parallel with one another, the third and fourth transverse sides extending between the first and second longitudinal sides; and a fifth longitudinal side extending between the first and second longitudinal sides and between the third and fourth transverse sides. The modular block also includes a sixth side disposed between the first and second longitudinal sides and between the third and fourth transverse sides, the sixth side including first and a second portions, a seventh side disposed between the first and second longitudinal sides and between the third and fourth transverse sides, the seventh side including a cable support surface extending from the first longitudinal side to the second longitudinal side; and first and second surfaces disposed between the sixth side and the seventh side and extending from the first longitudinal side to the second longitudinal side, the first and second surfaces cooperating to form a passage to allow a cable to pass from a position outside of the block to a position that is inside of the block. In addition the modular block further has a first ear disposed between the fifth longitudinal side and sixth side, the first ear extending beyond the third transverse side; and a second ear disposed between the fifth longitudinal side and the sixth side, the second ear extending beyond the third transverse side.

In another embodiment the disclosure includes a cable retention system having a base plate; a first wall coupled to the base plate; a second wall coupled to the base plate; a top plate selectively coupled to at least one of the first wall and second wall; and a first and second modular blocks. Each modular block includes first and second longitudinal sides spaced apart and substantially parallel with each other; third and fourth transverse sides spaced apart and substantially parallel with one another, the third and fourth transverse sides extending between the first and second longitudinal sides; a fifth longitudinal side extending between the first and second longitudinal sides and between the third and fourth transverse sides; and a sixth side disposed between the first and second longitudinal sides and between the third and fourth transverse sides, the sixth side including first and a second portions. Each modular block also has a seventh side disposed between the first and second longitudinal sides and between the third and fourth transverse sides, the seventh side including a cable support surface extending from the first longitudinal side to the second longitudinal side; first and second surfaces disposed between the sixth side and the seventh side and extending from the first longitudinal side to the second longitudinal side, the first and second surfaces cooperating to form a passage to allow a cable to pass from a position outside of the block to a position that is inside of the block; sixth side, the second ear extending beyond the fourth transverse side.

Yet another embodiment of the disclosure includes a modular block for retaining electrical cables having a rectangular block having a top wall, a bottom wall, a first side wall and a second side wall a first circular cutout disposed in the center of the rectangular block and a second cutout disposed in the first side wall, the second cutout being configured to allow a wire to pass from outside the block into the first circular cutout. The modular block also has a first ear coupled to the top wall, the first ear extending past a first plane that is coincident with the top wall; and a second ear coupled to the bottom wall, the second ear extending past a second plane that is coincident with the bottom wall.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
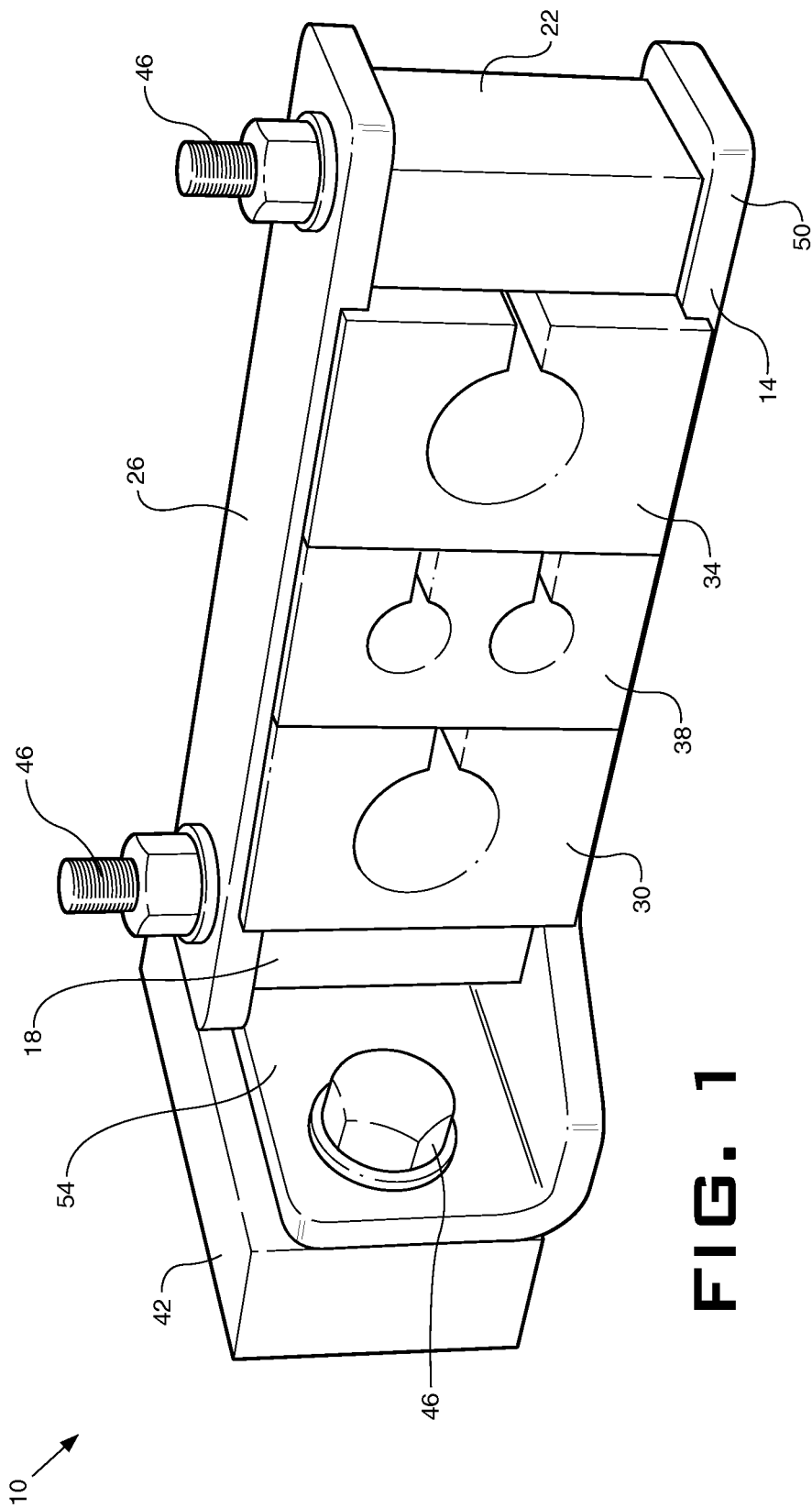
FIG. 1 is a perspective view of a cable retention system.

A cable retention system 10 is illustrated in FIG. 1. The cable retention system 10 includes a base plate 14, a first wall 18, a second wall 22, a top plate 26, a first modular block 30, a second modular block 34 and a third modular block 38. In some embodiments a mounting block 42 may be used. The mounting block 42 may be coupled to a structure using welding, adhesive, bolts or the like. In the illustrated embodiment the base plate 14 is selectively coupled to the mounting block 42 using bolts 46. In an alternative embodiment the base plate 14 may be coupled to a structure.

The base plate 14 is configured so that it may be selectively mountable to a structure or the mounting block 42. In the illustrated embodiment the base plate includes a first piece 50 and a second piece 54, the second piece 54 being disposed approximately orthogonal to the first piece 50. Openings are disposed on the second piece 54 to allow bolts 46 or the like to pass through the second piece 54 to assist in coupling the base plate 14 to a structure or the mounting block 42. Openings are also disposed on the first piece 50 to allow bolts 46 or the like to pass through to assist in coupling the first wall 18 and second wall 22 to the base plate 14. In an alternative embodiment the first wall 18 and second wall 22 may be integral to the base plate 14. In another alternative embodiment the first piece 50 may be approximately parallel to the second piece 54, or may be disposed at an angle between 0 and 90 degrees. In yet another alternative embodiment the first wall 18 and second wall 18 may be welded or otherwise bonded to the base plate 14. In some embodiments the first piece 50 may not have openings disposed thereon; rather, the bolts 46 are coupled to at least one of the first side wall 18 and second side wall 22 as will be described herein.

The first wall 18 and second wall 22 are substantially similar, so only the first wall 18 will be described. The first wall 18 is a cuboid and includes an opening disposed thereon to allow a bolt 46 or the like to pass therethrough. The first wall 18 and opening are configured to allow a bolt 46 or the like to couple the first wall 18 to the base plate 14 and top plate 26. In an alternative embodiment at least one of the first wall 18 and second wall 22 may have threads disposed thereon (by tapping a hole or the like), the threads being placed, sized and configured to mate with the bolt 46 to couple the top plate 26 to at least one of the first wall 18 and second wall 22. In yet another alternative embodiment the first wall 18 may be cylindrical.

The top plate 26 is a cuboid and includes openings disposed thereon to allow a bolt 46 or the like to pass therethrough. The openings are sized and configured to allow the top plate 26 to be coupled to the first wall 18 and second wall 22.

Figure 2:
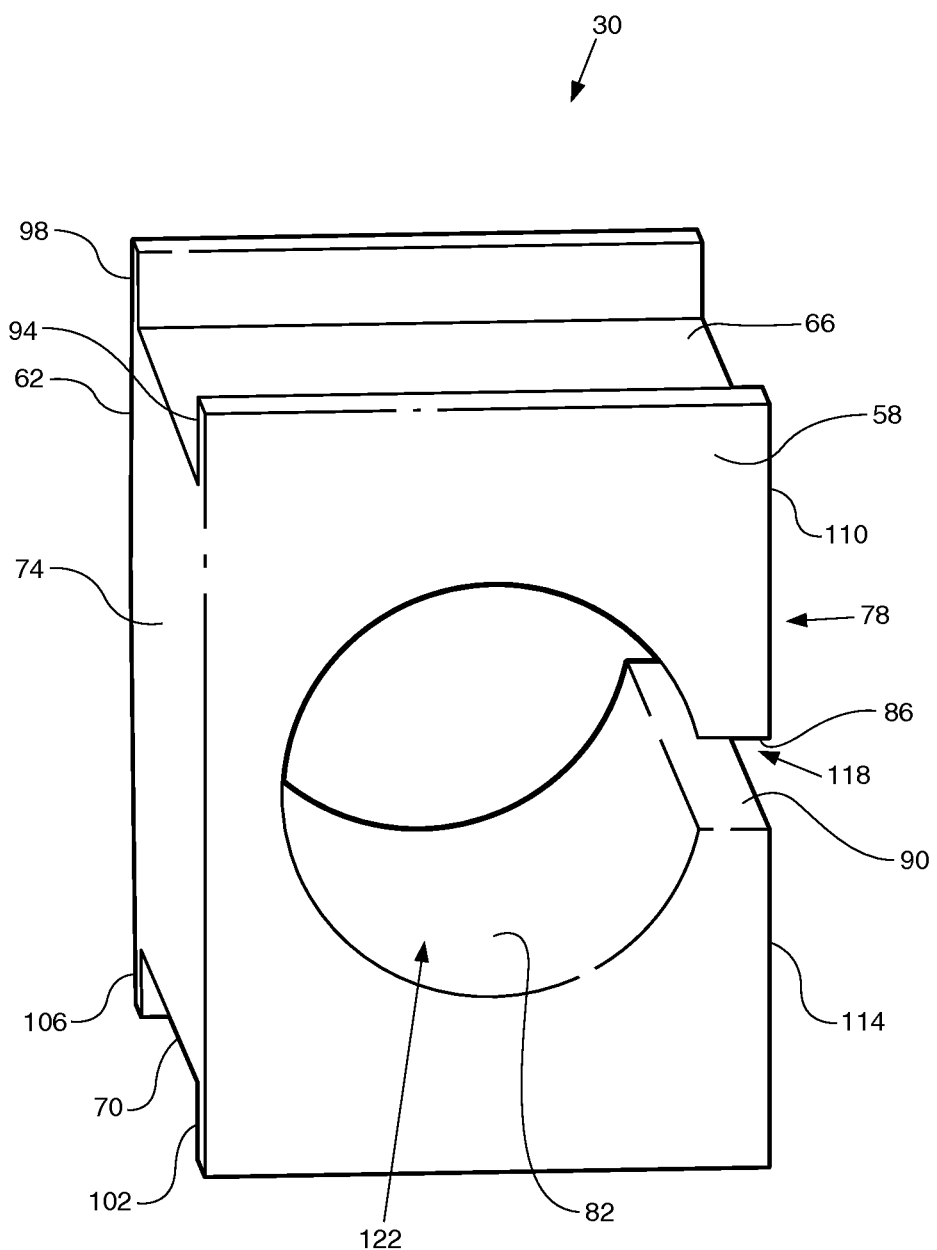
FIG. 2 is a perspective view of a modular block.

In the illustrated embodiment the first and second modular blocks 30, 34 are substantially similar, thus only the first modular block 30 will be described herein. The first modular block 30, best seen in FIG. 2, is approximately the shape of a cuboid. The first modular block 30 includes a first longitudinal side 58, a second longitudinal side 62, a third transverse side 66, a fourth transverse side 70, a fifth longitudinal side 74, a sixth side 78, a seventh side 82, a first surface 86, a second surface 90, a first ear 94, a second ear 98, a third ear 102 and a fourth ear 106. In the illustrated embodiment the first modular block 30 is made of a compressible material such as urethane or rubber. In an alternative embodiment the first modular block 30 may be made of a compressible material having a hardness between 60 Shore A and 90 Shore A. In another embodiment the first modular block 30 may be made of a compressible material having a hardness between 75 Shore A and 85 Shore A.

The first longitudinal side 58 of the first modular block 30 is substantially planar. The second longitudinal side 62 is spaced apart from the first longitudinal side 58. The second longitudinal side 62 is substantially parallel to the first longitudinal side 58. The third transverse side 66 includes a substantially parallel surface. The third transverse 66 side is substantially orthogonal to the first longitudinal side 58 and second longitudinal side 62. The fourth transverse side 70 is spaced apart from the third transverse side 66. The fourth transverse side 70 is substantially parallel to the third transverse side 66. The third and fourth transverse sides 66, 70 extend between the first and second longitudinal sides 58, 62. The fifth longitudinal side 74 extends between the first and second longitudinal sides 58, 62 and the third and fourth transverse sides 66, 70. The sixth side 78 is spaced apart from the fifth longitudinal side 74 and is substantially parallel to the fifth longitudinal side 74. The sixth side 78 includes a first portion 110 and a second portion 114. The first portion 110 is spaced apart from the second portion 114. The first portion 110 is substantially parallel to the second portion 114.

The first surface 86 of the first modular block 30 borders the first portion 110 and is substantially orthogonal to the first longitudinal side 58. The first surface 86 extends between the first longitudinal side 58 and second longitudinal side 62. The first surface 86 is between the first portion 110 and the seventh side 82. The second surface 90 borders the second portion 114 and is substantially orthogonal to the first longitudinal side 58. The second surface 90 extends between the first longitudinal side 58 and second longitudinal side 62. The second surface 90 is between the second portion 114 and the seventh side 82. The second surface 90 is substantially parallel to the first surface 86. The second surface 90 is spaced apart from the first surface 86, such that the first surface 86 and second surface 90 cooperate to create an opening 118 which may be used as a passage on the first modular block 30. In the illustrated embodiment the distance between the first and second surfaces 86, 90 is at least ten percent of the distance between the third and fourth transverse sides 66, 70 and may be between ten percent and thirty percent of the distance between the third and fourth transverse sides 66, 70.

The seventh side 82 is disposed in an interior portion of the first modular block 30. The seventh side 82 extends between the first longitudinal side 58 and second longitudinal side 62. In the illustrated embodiment the seventh side 82 is substantially circular, although other shapes are contemplated. As can be seen in FIG. 2, the seventh side 82 does not make a complete circle; rather, there is a break on the seventh side 82 where the seventh side 82 meets the first surface 86 and second surface 90. The seventh side 82 includes a cable support surface 122, the cable support surface 122 extending from the first longitudinal side 58 to the second longitudinal side 62. In one embodiment the distance between the first and second surfaces 86, 90 is between fifteen percent and thirty percent of the diameter of the circle formed by the seventh side 82.

Figure 3:
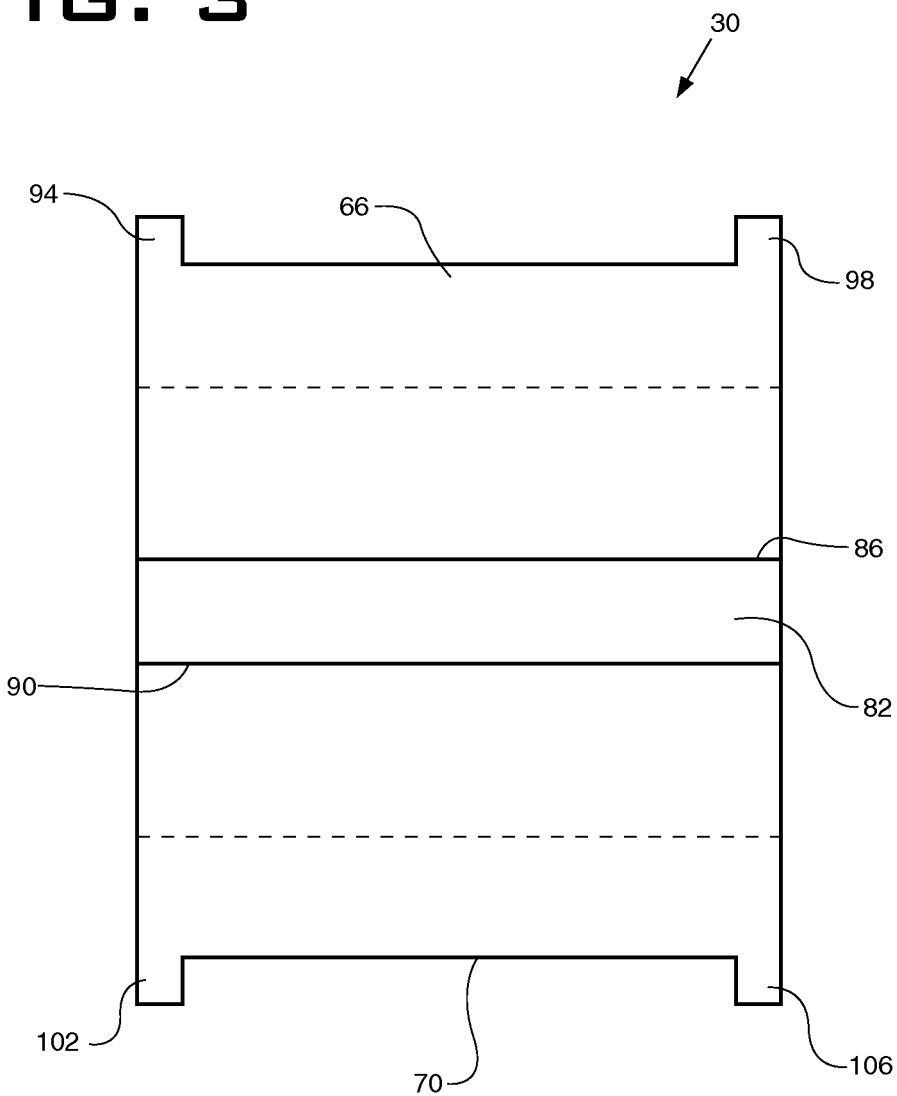
FIG. 3 is a side view of the modular block of FIG. 2.

The first ear 94 of the first modular block 30 extends between the fifth longitudinal side 74 and sixth side 78. The first ear 94 extends beyond the third transverse side 66, as best seen in FIG. 3. In an alternative embodiment the first ear 94 may extend only partway between the fifth longitudinal side 74 and sixth side 78. The second ear 98 extends beyond the third transverse side 66. The second ear 98 extends between the fifth longitudinal side 74 and sixth side 78. In an alternative embodiment the second ear 98 may extend only partway between the fifth longitudinal side 74 and sixth side 78. The third ear 102 extends between the fifth longitudinal side 74 and sixth side 78. The third ear 102 extends beyond the fourth transverse side 70. In an alternative embodiment the third ear 102 may extend only partway between the fifth longitudinal side 74 and sixth side 78. The fourth ear 106 extends between the fifth longitudinal side 74 and sixth side 78. The fourth ear 106 extends beyond the fourth transverse side 70. In an alternative embodiment the fourth ear 106 may extend only partway between the fifth longitudinal side 74 and sixth side 78.

Figure 4:
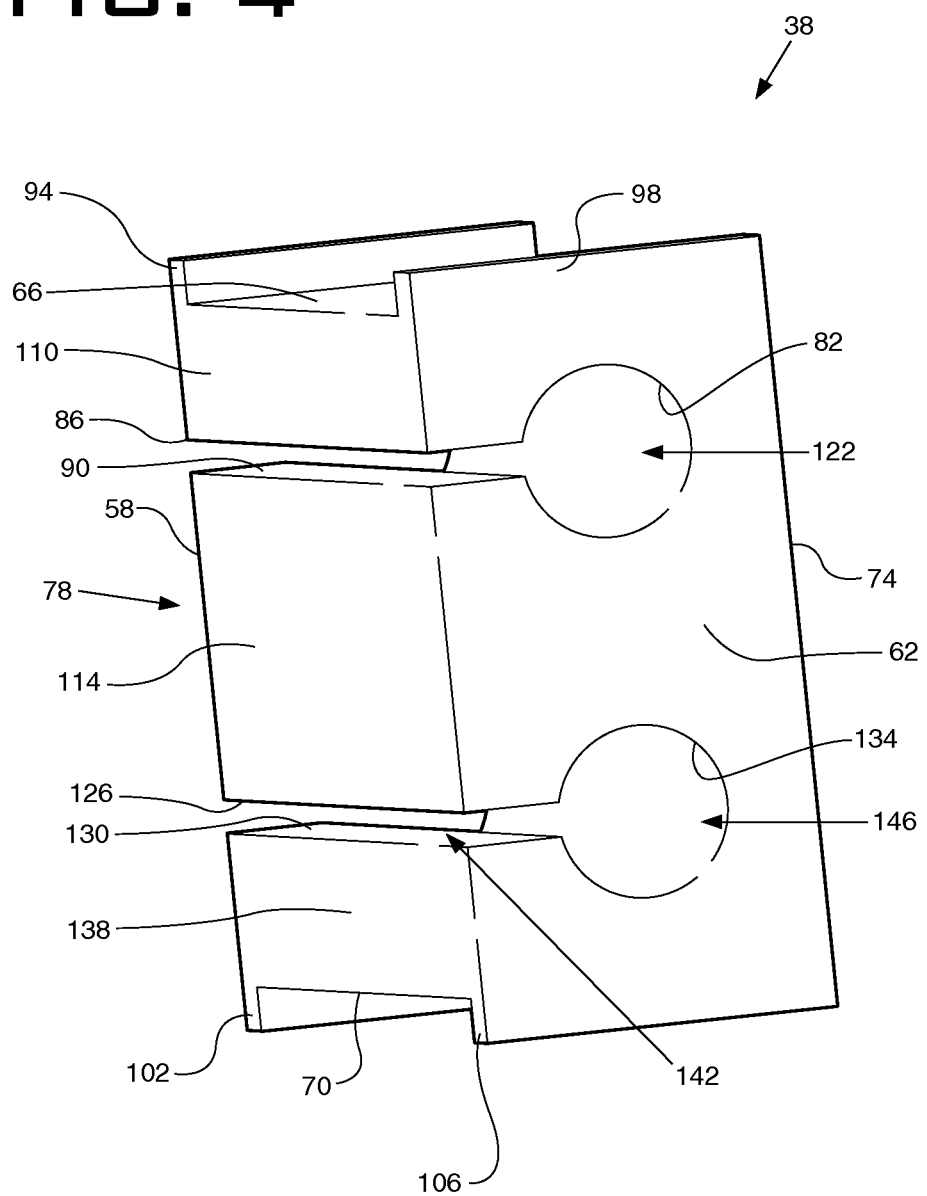
FIG. 4 is a perspective view of an alternative embodiment of the modular block of FIG. 2.

The third modular block 38 is best seen in FIG. 4. The third modular block 38 is very similar to the first modular block 30, thus only the differences will be described. The primary differences are that the third modular block 38 includes a third surface 126, a fourth surface 130 and an eighth side 134. In addition, the sixth side 78 includes a third portion 138.

The third surface 126 borders the second portion 114 and is substantially orthogonal to the first longitudinal side 58. The third surface 126 extends between the first longitudinal side 58 and second longitudinal side 62. The third surface 126 is between the second portion 114 and the eighth side 134. The fourth surface 130 is between the third portion 138 and the eighth side 134. The fourth surface 130 is substantially parallel to the third surface 126. The fourth surface 130 is spaced apart from the third surface 126, such that the third surface 126 and fourth surface 130 cooperate to create an opening 142 which may be used as a passage on the third modular block 38. The eighth side 134 is disposed in an interior portion of the third modular block 38. The eighth side 38 extends between the first longitudinal side 58 and second longitudinal side 62. In the illustrated embodiment the eighth side 134 is substantially circular, although other shapes are contemplated. As can be seen in FIG. 4, the eighth side 134 does not make a complete circle, rather, there is a break on the eighth side 134 where the eighth side 134 meets the third surface 126 and fourth surface 130. The eighth side 134 includes a cable support surface 146, the cable support surface 146 extending from the first longitudinal side 58 to the second longitudinal side 62.

The assembly of the cable retention system 10 will now be described. The base plate 14 is mounted to a structure or frame of a vehicle. One or more cables to be restrained are passed through the opening 118 between the first surface 86 and second surface 90 on the first modular block 30. Additional cables may be placed into other modular blocks as needed. The first modular block 30, and any other modular blocks being used, is then placed on the base plate 14 so that the third and fourth ears 102, 106 straddle the base plate 14, as shown in FIG. 1. The first wall and second wall 18, 22 are then placed on the base plate 14, if the first wall and second wall 18, 22 are not integral to the base plate 14. The top plate 26 is then placed on top of the first wall 18, second wall 22 and modular block(s) 30 so that the first and second ears 94, 98 straddle the top plate 26. Nuts and bolts 46 or the like are then placed through openings on the top plate 26, first wall 18, second wall 22 and base plate 14 and secured. As the nuts and bolts 46 are secured, the top plate 26 will move towards the base plate 14 compressing the modular block(s) 30 so as to assist in securing the modular block(s) 30 between the base plate 14 and top plate 26.

In an alternative embodiment the top plate 26 may serve also serve as the base plate 14 for another cable retention system 10 to allow for additional modular blocks to be used.

INDUSTRIAL APPLICABILITY

The disclosed apparatus may be used to secure electrical cables and/or fluid hoses to a structure or vehicle frame. The cable retention system 10 allows for cables to be added or removed to the cable retention system 10 as needed. In addition, the cable retention system 10 is modular such that modular blocks may be added or removed as needed.

The seventh side and eighth sides 82, 134 allow for cables or hoses to be secured, without placing unnecessary strain on some or all of the cable or hose. In some embodiments when the first modular block 30 is compressed the compression assists in securing the hose or cable with respect to the first modular block 30. The compression also assists the first, second, third and fourth ears 94, 98, 102, 106 in inhibiting the first modular block 30 from removing with respect to the base plate 14 and/or top late 26. The opening 118 between the first surface 86 and second surface 90 allows for irregular shaped electrical cables (such as multiple wires bundled together) to be used while reducing the danger that the first surface and second surface 86,90 will be pressed together which may result in a portion of the cable being pinched and/or severed.

It will be apparent to those skilled in the art that various modifications can be made to the disclosed machine. Other embodiments will be apparent to those skilled in the art from consideration of the specification and practice of the disclosed machine. It is intended that the specification and examples be considered as exemplary only, with a true scope being indicated by the following claims and their equivalents.

What is claimed is:

1. A modular block for a retention system comprising:
   first and second longitudinal sides spaced apart and substantially parallel with each other;
   third and fourth transverse sides spaced apart and substantially parallel with one another, the third and fourth transverse sides extending between the first and second longitudinal sides;
   a fifth longitudinal side extending between the first and second longitudinal sides and between the third and fourth transverse sides;
   a sixth side disposed between the first and second longitudinal sides and between the third and fourth transverse sides, the sixth side including first and a second portions,
   a seventh side disposed between the first and second longitudinal sides and between the third and fourth transverse sides, the seventh side including a cable support surface extending from the first longitudinal side to the second longitudinal side;
   first and second surfaces disposed between the sixth side and the seventh side and extending from the first longitudinal side to the second longitudinal side, the first and second surfaces cooperating to form a passage to allow a cable to pass from a position outside of the block to a position that is inside of the block;
   a first ear extending from the fifth longitudinal side to the sixth side, the first ear extending beyond the third transverse side; and
   a second ear extending from the fifth longitudinal side to the sixth side, the second ear extending beyond the third transverse side.

2. The modular block of claim 1 wherein the distance between the first and second surfaces is equal to at least fifteen percent of the distance between the third and fourth transverse sides.

3. The modular block of claim 2 wherein the modular block is made of a compressible material having a hardness between 60 Shore A and 90 Shore A.

4. The modular block of claim 2 further comprising:
   a third ear disposed between the fifth longitudinal side and sixth side, the third ear extending beyond the fourth transverse side; and a fourth ear disposed between the fifth longitudinal side and the sixth side, the fourth ear extending beyond the fourth transverse side.

5. The modular block of claim 4 wherein a front surface of the first ear is substantially coplanar with the first longitudinal side.

6. The modular block of claim 5 wherein a front surface of the fourth ear is substantially coplanar with the second longitudinal side.

7. The modular block of claim 2 wherein the seventh side is substantially circular.

8. The modular block of claim 7 wherein the distance between the first and second surfaces is equal to at least twenty percent of the diameter of the seventh side.

9. A retention system comprising:
   a base plate;
   a first wall coupled to the base plate;
   a second wall coupled to the base plate;
   a top plate selectively coupled to at least one of the first wall and second wall; and
   a first and second modular blocks, each modular block comprising:
      first and second longitudinal sides spaced apart and substantially parallel with each other;
      third and fourth transverse sides spaced apart and substantially parallel with one another, the third and fourth transverse sides extending between the first and second longitudinal sides;
      a fifth longitudinal side extending between the first and second longitudinal sides and between the third and fourth transverse sides;
      a sixth side disposed between the first and second longitudinal sides and between the third and fourth transverse sides, the sixth side including first and a second portions,
      a seventh side disposed between the first and second longitudinal sides and between the third and fourth transverse sides, the seventh side including a cable support surface extending from the first longitudinal side to the second longitudinal side;
      first and second surfaces disposed between the sixth side and the seventh side and extending from the first longitudinal side to the second longitudinal side, the first and second surfaces cooperating to form a passage to allow a cable to pass from a position outside of the block to a position that is inside of the block;
      a first ear extending from the fifth longitudinal side to the sixth side, the first ear extending beyond the third transverse side; and
      a second ear extending from the fifth longitudinal side to the sixth side, the second ear extending beyond the fourth transverse side.

10. The retention system of claim 9 wherein the first and second modular blocks are compressed when the top plate is coupled to at least one of the first wall and second wall.

11. The retention system of claim 10 wherein the first modular block is made of a compressible material having a hardness between 60 Shore A and 90 Shore A.

12. The retention system of claim 10 wherein each modular block further comprises:
   a third ear disposed between the fifth longitudinal side and sixth side, the third ear extending beyond the third transverse side; and
   a fourth ear disposed between the fifth longitudinal side and the sixth side, the fourth ear extending beyond the fourth transverse side.

13. The retention system of claim 12 wherein the first and second modular blocks are compressed when the top plate is coupled to at least one of the first wall and second wall.

14. The retention system of claim 13 wherein a front surface of the first ear is substantially coplanar with the first longitudinal side.

15. The retention system of claim 14 wherein a front surface of the third ear is substantially coplanar with the second longitudinal side.

16. The retention system of claim 9 wherein the seventh side is substantially circular.

17. The retention system of claim 9 wherein the first ear and second ear are configured to inhibit each modular block from moving in a first direction with respect to the base plate.

18. A modular block for retention comprising:
   a rectangular block having a top wall, a bottom wall, a first side wall, a second side wall, a first circular cable support surface disposed in the rectangular block and an opening disposed in the first side wall, the opening being configured to allow a wire to pass from outside the block towards the cable support surface;
   a first ear and a second ear coupled to the top wall, the first ear and the second ear extending in a direction that is orthogonal to the first side wall; and
   a third ear and a fourth ear coupled to the bottom wall, the third ear and the fourth ear extending in a direction that is orthogonal to the first side wall.

19. The modular block of claim 18 wherein:
   the second ear is disposed on a side of the block that is opposite from the side of the block where the first ear is disposed, the first ear and the second ear extending in a direction that is orthogonal to the top wall; and
   the fourth ear is disposed on a side of the block that is opposite from the side of the block where the third ear is disposed, the third ear and the fourth ear extending in a direction that is orthogonal to the bottom wall.

20. The modular block of claim 19 wherein the rectangular block is made of a compressible material having a hardness between 60 Shore A and 90 Shore A.

* * * * *